United States Patent
Melby et al.

(10) Patent No.: US 10,337,864 B2
(45) Date of Patent: Jul. 2, 2019

(54) METHOD FOR CALCULATING THE DISTANCE TO A GROUND TARGET FROM AN AERIAL VEHICLE

(71) Applicant: FLIR Unmanned Aerial Systems AS, Hvalstad (NO)

(72) Inventors: Jorunn Helene Melby, Oslo (NO); Jorgen Syvertsen, Eidsvoll (NO); Petter Muren, Nesbru (NO); Tom-Ivar Johansen, Drammen (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 0 days.

(21) Appl. No.: 15/552,195

(22) PCT Filed: Feb. 17, 2016

(86) PCT No.: PCT/EP2016/053302
§ 371 (c)(1),
(2) Date: Aug. 18, 2017

(87) PCT Pub. No.: WO2016/131847
PCT Pub. Date: Aug. 25, 2016

(65) Prior Publication Data
US 2018/0051986 A1    Feb. 22, 2018

(30) Foreign Application Priority Data
Feb. 20, 2015 (NO) .................................... 20150246

(51) Int. Cl.
*G06K 9/00* (2006.01)
*G01C 11/06* (2006.01)
(Continued)

(52) U.S. Cl.
CPC ............ *G01C 11/06* (2013.01); *B64C 39/024* (2013.01); *G01C 5/005* (2013.01); *G05D 1/042* (2013.01);
(Continued)

(58) Field of Classification Search
CPC combination set(s) only.
See application file for complete search history.

(56) References Cited

U.S. PATENT DOCUMENTS

| 5,104,217 A | 4/1992 | Pleitner et al. |
| 5,606,627 A | 2/1997 | Kuo |

(Continued)

OTHER PUBLICATIONS

Min S. Kang et al., "Recovering an Elevation Map by Stereo Modeling of the Aerial Image Sequence", Optical Engineering, Soc. of Photo-Optical Instrumentation Engineers, Bellingham, vol. 33, No. 11, Nov. 1, 1994, pp. 3793-3802, XP000475122, ISSN: 0091-3286.

(Continued)

*Primary Examiner* — Alex Kok S Liew
(74) *Attorney, Agent, or Firm* — Haynes and Boone, LLP

(57) ABSTRACT

The present invention relates to a system and a method for measuring and determining the depth, offset and translation in relation to one or several features in the field of view of an image sensor equipped UAV. The UAV comprises at least an autopilot system capable of estimating rotation and translation, processing means, height measuring means and one or more imaging sensor means. Given the estimated translation provided by the autopilot system, the objective of the present invention is achieved by the following method; capturing an image, initiating a change in altitude, capturing a second image, comparing the images and the change in height provided by the sensor to produce a scale factor or depth. If depth is estimated, then calculating the scale factor (Continued)

from the depth, and calculating the actual translation with the resulting scale factor.

20 Claims, 7 Drawing Sheets

(51) Int. Cl.
G01C 5/00 (2006.01)
G06T 7/579 (2017.01)
G06T 7/70 (2017.01)
B64C 39/02 (2006.01)
G05D 1/04 (2006.01)
H04N 5/225 (2006.01)
G01S 11/12 (2006.01)

(52) U.S. Cl.
CPC .............. G06T 7/579 (2017.01); G06T 7/70 (2017.01); H04N 5/2253 (2013.01); B64C 2201/141 (2013.01); G01S 11/12 (2013.01); G05D 1/046 (2013.01); G06T 2207/10032 (2013.01)

(56) References Cited

U.S. PATENT DOCUMENTS

| | | | |
|---|---|---|---|
| 8,548,194 B1* | 10/2013 | Lyon | G01C 5/005 382/103 |
| 2003/0118213 A1 | 6/2003 | Parker | |
| 2005/0273259 A1 | 12/2005 | Qwarfort | |
| 2009/0125223 A1 | 5/2009 | Higgin | |
| 2012/0069019 A1 | 3/2012 | Richards | |
| 2014/0316614 A1* | 10/2014 | Newman | G06Q 30/0611 701/3 |

OTHER PUBLICATIONS

Pfrunder Andreas et al.: "A Proof-of-Concept Demonstration of Visual Teach and Report on a Quadrocopter Using an Altitude Sensor and a Monocular Camera", 2014 Canadian Conference on Computer and Robot Vision, IEEE, May 6, 2014, pp. 238-245, XP032596810, DOI: 10.1109/CRV.2014.40 [retrieved on May 15, 2014] abstract.

* cited by examiner

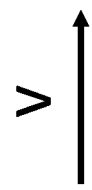
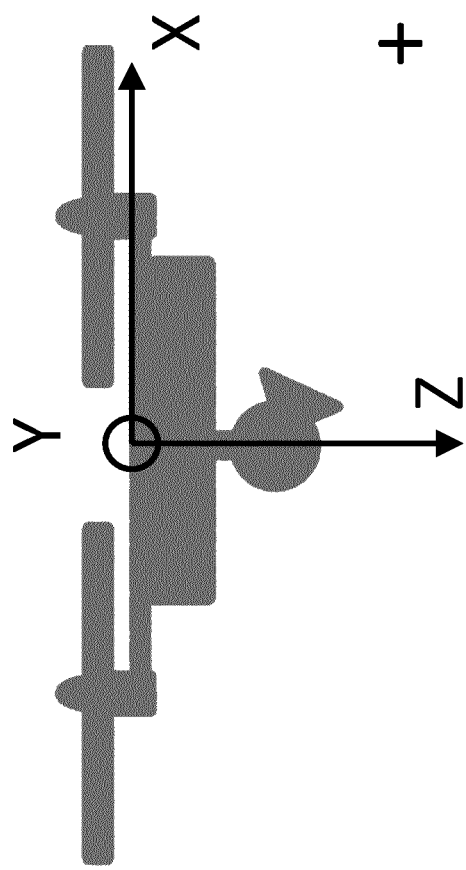
Figure 1a
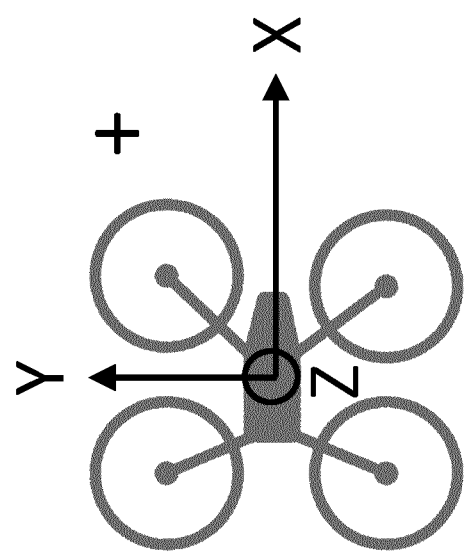
Figure 1b

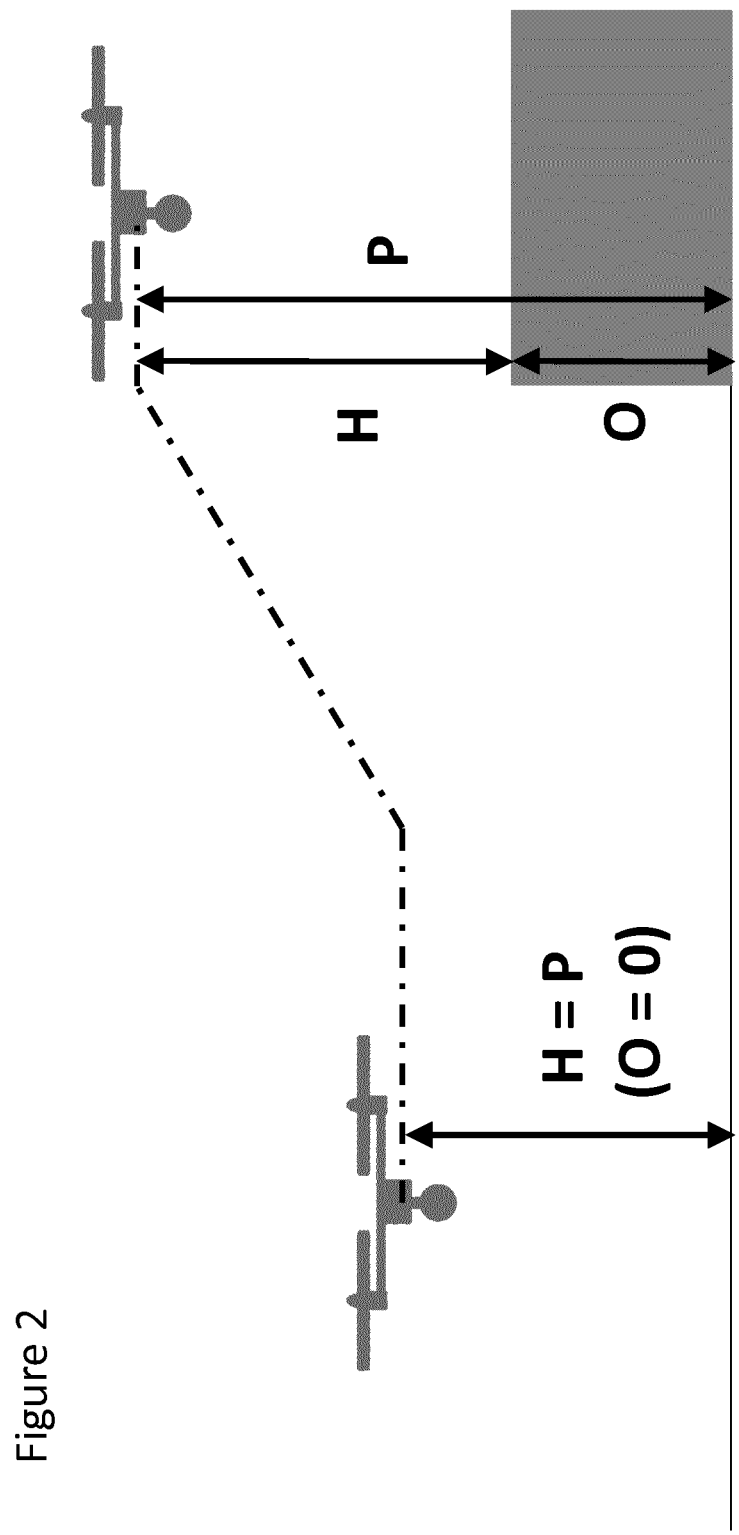

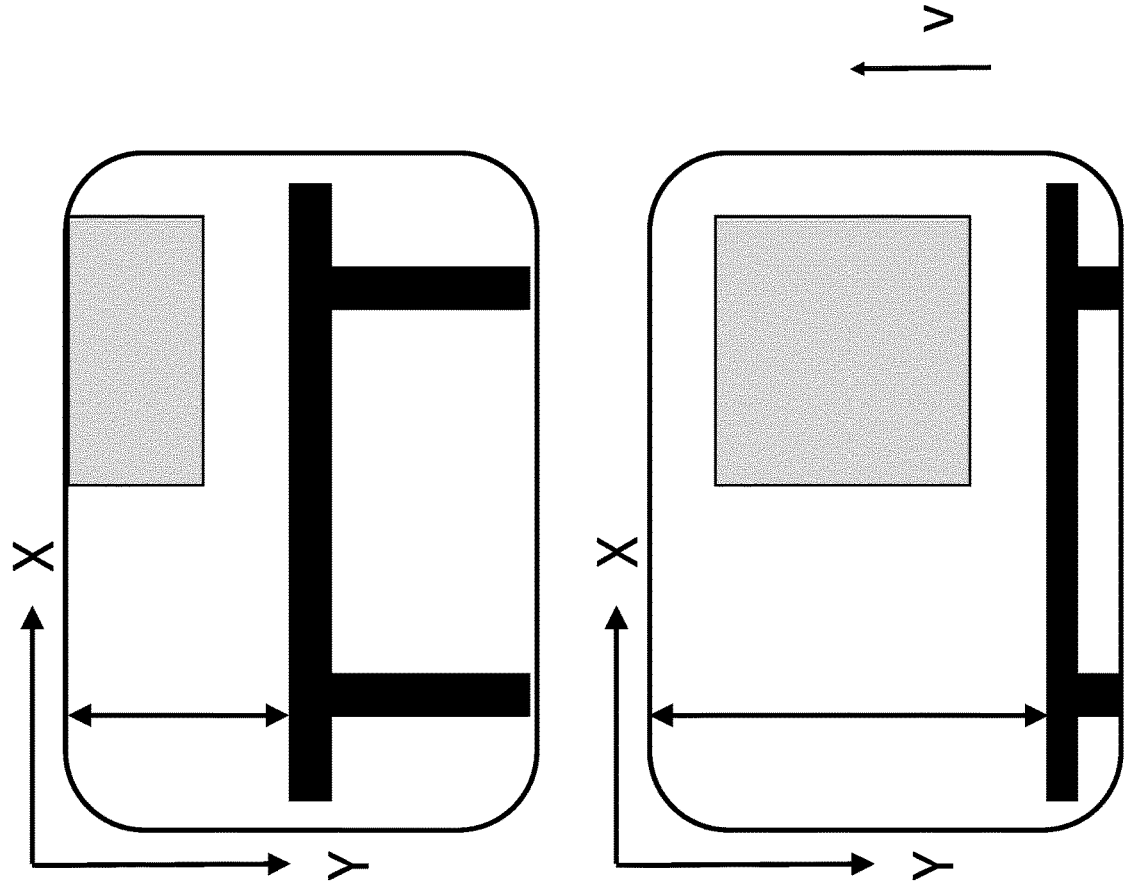

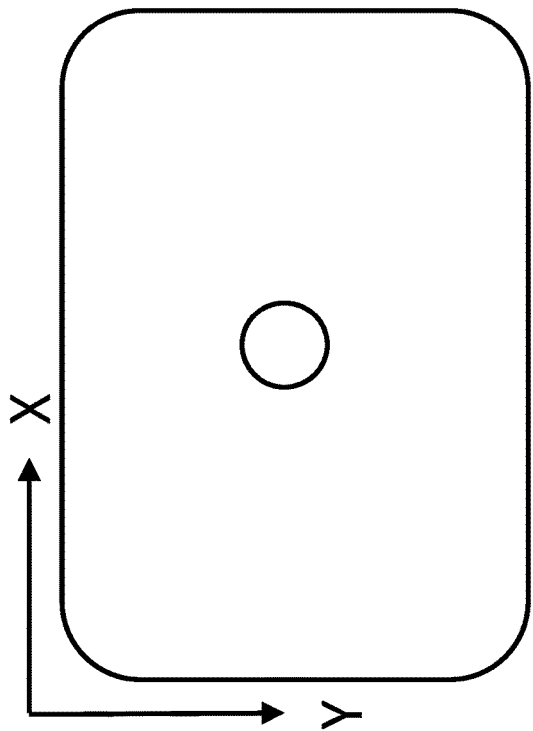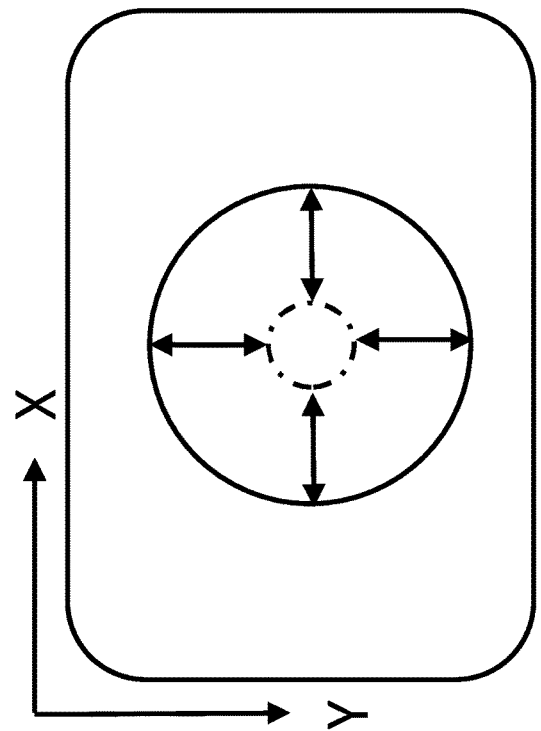
Figure 6a
Figure 6b

METHOD FOR CALCULATING THE DISTANCE TO A GROUND TARGET FROM AN AERIAL VEHICLE

CROSS-REFERENCE TO RELATED APPLICATIONS

This patent application is a U.S. National Stage Patent Application under 35 U.S.C. 371 of International Patent Application No. PCT/EP2016/053302, filed Feb. 17, 2016 and entitled "METHOD FOR CALCULATING THE DISTANCE TO A GROUND TARGET FROM AN AERIAL VEHICLE," which claims priority to and the benefit of Norway Patent Application NO20150246, filed Feb. 20, 2015 and entitled "DEPTH MEASUREMENT SYSTEM," which are all hereby incorporated by reference in their entirety.

FIELD OF THE INVENTION

The present invention relates to a system and a method for measuring and determining the depth, offset and translation in relation to one or several features in the field of view of an image sensor equipped UAV.

BACKGROUND OF THE INVENTION

Unmanned Aerial Vehicles (UAVs) are employed in a wide range of applications, both civilian and military, including inspection, intelligence, reconnaissance and rescue missions. UAV designs ranges from large fixed wing jets to smaller rotary wing aircraft with one or more rotors. Progress in the electronics industry over the past decades has made it possible to shrink the components necessary for a UAV system to become palm sized, Micro Air Vehicle (MAV). These vehicles can, for example, lift a camera and transmit images, while still being highly maneuverable. The size and maneuverability make MAVs an ideal tool for close range applications, e.g. reconnaissance, inspection and surveillance.

Modern UAVs operate over longer distances and in all environments, rural or urban. Control of a UAV rely on transmission from onboard sensors to a remote unit, containing a display unit, which is operated by the pilot. The pilot is able to steer the aircraft throughout the entire mission solely relying on the received images.

Sophisticated autopilot systems have also been implemented to assist in keeping the aircraft stable, thus providing easier operational control for the pilot. To function optimally it is necessary for these autopilot systems to know the position of the aircraft, i.e. where it is and has been. This to keep the aircraft stable in relation to a position, but also to counter, for example, a wind blow.

During outdoor operations, one may rely on GPS systems to provide the autopilot with the necessary position, which it then uses for further calculations. However, recent advances in UAV design and new application areas also makes it desirable to operate in areas with low or no GPS coverage, or to increase the accuracy of the autopilot system. For example, GPS signal reception indoors is poor or non-existing; requiring other means of determining the necessary information.

To increase the accuracy or operate in areas with low or no GPS, the autopilot system needs to obtain a position by some other means. Images captured at different times can be used to determine the 3D translation and rotation of the camera from one image to another. However, images have an inherent scale ambiguity, so in order for the autopilot system to utilize the translation thus obtained it must first be converted into the correct scale. This can be done with a scale factor, which when multiplied with the translation, converts the translation into the desired unit. For practical purposes, measurements will in this document be referred in the metric system. Such a scale factor can be calculated if one knows the depth, i.e. distance, from the camera to one or several features in the images. A feature can be any detectable object or structure that is possible to identify in the images.

Several solutions offer to produce the depth measurements required to calculate the scale factor by utilizing the onboard camera capabilities. An example of one of these solutions, utilize a stereo vision system with two cameras in each relevant orientation. By comparing two or more pictures captured by camera A and B at the same time with known translation from camera A to camera B, a depth to each feature is determined. This solution does however require two separate cameras in each of the directions were one would want to measure the depth, complicating the UAV system unnecessarily. With the strict weight and size requirements of MAVs, it is often not possible to include this system in the design.

Another example of a system that addresses this issue is monocular vision depth estimation. This solution utilize a so-called Kalman filter per feature calculation, providing the depth through a series of measurements over time. This, however, implies that the system will have to observe each feature for a certain number of time steps to be able to calculate the actual depth. Thus, the solution is computationally expensive.

Therefore, there is a need for a system that can calculate the depth for use in a UAV system that is computationally less expensive and requires few additional means, but still meets the requirements of modern day UAVs.

SUMMARY OF THE INVENTION

An object of embodiments herein is to overcome or at least alleviate the above-mentioned disadvantage. This object and other objects are achieved by the independent claims enclosed herewith.

A method for calculating a distance to a target feature from an Aerial Vehicle equipped with an image sensor with a certain focal length (f) being able to be oriented in a vertical plane having the vertical downwards direction defined as 0° direction, and an height measuring mean adjusted to measure aviation altitude of the Aerial Vehicle, wherein:

in a first position of the Aerial Vehicle, capturing a first image including the target feature and a number of adjacent features by the image sensor and measuring a first aviation altitude ($P_A$), altering the position of the Aerial Vehicle from the first position to a second position, in the second position of the Aerial Vehicle, capturing a second image including the feature and the number of adjacent features by the image sensor and measuring a second aviation altitude ($P_B$), calculating the distance to the target feature from the Aerial Vehicle in the second position by means of the first aviation altitude ($P_A$), the second aviation altitude ($P_B$), a first position of the target feature in terms of image pixel coordinates ($x_A$, $y_A$) within the first image, and a second position of the target feature in terms of image pixel coordinates ($x_B$, $y_B$) within the second image.

The method as defined in an alternative embodiment, wherein that when the image sensor is oriented in the interval <335°, 25°] or <155°, 205°] in a vertical plane, then the step of calculating the distance to the target feature from the Aerial Vehicle in the second position is executed by the following equation:

$$P_B + \frac{\left(P_B - P_A * \frac{sdA}{sdB}\right)}{\frac{sdA}{sdB} - 1}$$

where sdA is a sum of respective distances in terms of image pixels within the first image from the target feature to the number of adjacent features, and sdB is a sum of respective distances in terms of image pixels within the second image from the target feature to the number of adjacent features.

The method as defined in an alternative embodiment, wherein that when the image sensor is oriented between <25°, 65°] or <115°, 155°] or <205°, 245°] or <295°, 335°] in a vertical plane, then the step of calculating the distance to the target feature from the Aerial Vehicle in the second position is executed by the following equation:

$$\frac{|P_B - P_A|}{\left(\frac{sdA}{sdB} - 1\right)} + |P_B - P_A|$$

where sdA is a sum of respective distances in terms of image pixels within the first image from the target feature to the number of adjacent features, and sdB is a sum of respective distances in terms of image pixels within the second image from the target feature to the number of adjacent features.

The method as defined in an alternative embodiment, wherein that when the image sensor is oriented in the interval <65°, 115°] or <245°, 295°] in a vertical plane, then the step of calculating the distance to the target feature from the Aerial Vehicle in the second position is executed by the following equation:

$$\frac{f * |P_B - P_A|}{|y_B - y_A|}$$

BRIEF DESCRIPTION OF THE DRAWINGS

FIG. 1a illustrates an aircraft according to one example embodiment with the associated general axis of direction, seen from the side. Note that the Z-axis has a positive direction of movement down.

FIG. 1b illustrates an aircraft according to one example embodiment with the general axis of direction, seen from above.

FIG. 2 illustrates an aircraft according to one example embodiment deployed in a scene for illustrative purposes. Here, the aircrafts starts at a position where the pressure sensor reading P equals the height H, and the offset O is zero. The aircraft further climbs to an altitude over a box where P equals an offset O and the aircraft's relative height H.

FIG. 5a illustrates an example of an image A, captured with a horizontal camera position before an alteration in altitude, and the direction of measurement from the edge of the captured image to a feature.

FIG. 5b illustrates an example of an image B, captured with a horizontal camera position after an alteration in altitude, and the direction of measurement from the edge of the captured image to a feature.

FIG. 6a illustrates an example of an image A, captured with a vertical camera position before an alteration in altitude.

FIG. 6b illustrates an example of an image B, captured with a vertical camera position after an alteration in altitude. Image A and B are compared and the difference in position is calculated.

DETAILED DESCRIPTION OF AN EXAMPLE EMBODIMENT

Figure 3A:
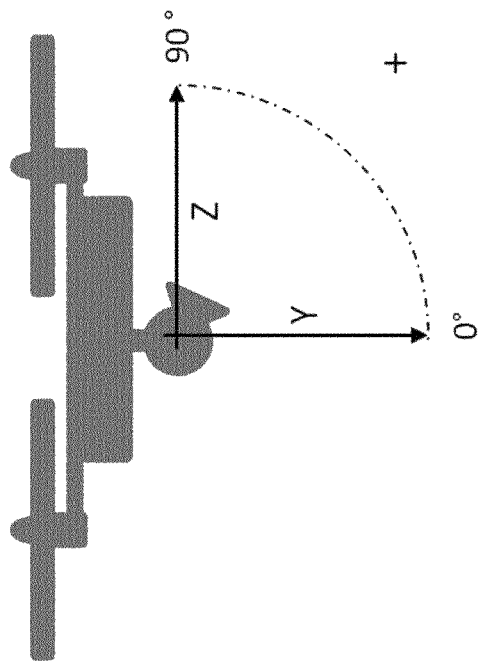
FIG. 3a illustrates an aircraft according to one example embodiment with the direction and the orientation of the camera angles shown.

The present invention relates to a system and a method for measuring and determining the depth, offset and translation in relation to one or several features in the field of view of an image sensor equipped UAV. In the following, the present invention will be discussed and example embodiments described in examples illustrating the camera orientated vertically, horizontally and in between these two.

The embodiments herein relates to a UAV comprising at least an autopilot system capable of estimating rotation and translation, processing means, height measuring means and one or more imaging sensor means. The aircraft is further able to track the imaging sensor's position and determine which one of at least three predefined thresholds each of the at least one or more imaging sensor is positioned in. Purely as an example, these at least three thresholds could be divided in degrees, between 0°-25°, 25°-65° and 65°-90° in relation to a horizontal axis. Further, these values may be used to determine which method is further employed to calculate the depth to a feature, as to be explained herein below.

Alternatively, the aircraft according to the example embodiment may have several imaging sensors, where one or more is pointing in a general horizontal direction, one or more is pointing in a generally vertical direction, and one or more is pointing in a direction in between. The aircraft may in this example embodiment calculate these depths continuously. Further, the imaging sensors may be set up to compute the depth according to the method provided by their orientation as to be explained herein below.

According to one aspect of the present embodiments, the one or more imaging sensor can be one or more of several types of imaging sensors, for example a still frame camera, a video camera, a thermographic camera, a radar and/or any other relevant, or combinations of, imaging sensors. For ease of reading, an imaging sensor is further referred to as a camera.

Further, according to one aspect of the present embodiments, the height-measuring means may be one of several different height-measuring sensors. In the following, an example embodiment with an air pressure sensor as the height-measuring means will be described, but the system would, with minimal adaptations, work with any other sensor capable of depth or height measurement. For example, the sensor can be an ultra sound sensor, a laser sensor, a radar sensor or any other relevant distancing sensors.

An estimated translation is provided by the autopilot system, and the objective of the present invention is achieved by the following method; capturing an image, initiating a change in altitude, capturing a second image, comparing the images and the change in height provided by the sensor to produce a scale factor or depth, as to be explained herein below. If depth is estimated, then calculating the scale factor from the depth, and calculating the actual translation with the resulting scale factor.

According to one embodiment of the present invention, it is necessary to initiate an altitude change of the aircraft, also referred to as aviation altitude, for two reasons. First, to provide the processing means with a defined measurement of movement, from which they may calculate the aircraft's actual translation in meters. Provided by the height measuring mean. Second, to provide the processing capabilities with two images from which it may calculate the depth in relationship to certain features, as mentioned and to be explained. Provided by the camera.

Further, according to one example embodiment, the sensor means is an air pressure sensor. An air pressure sensor measures the current air pressure and may be used to measure a change in altitude relative to a defined reference. In other words, the air pressure at one position is compared to a reference air pressure at another and the difference between then is converted into a height in meters.

In a real-life implementation, an air pressure sensor will drift over time, but during short time intervals, the drift is small and may thus be assumed to be zero. One skilled in the art would appreciate that the difference in pressure therefore is an accurate measurement of the actual change in height experienced by the aircraft.

Actual height above ground is given by:

$$H = P + O$$

Where: H is local height above ground, floor, table etc. in meters, P is the air pressure sensor reading converted to meter, and O is the difference between the pressure sensor measurement and the relative local height in meters. The aircraft's Z-axis is oriented down, with reference to FIG. 1A and the scene illustrated in FIG. 2.

To further explain what is meant by offset; a pressure sensor measurement is a height above some predefined reference point, for example the starting position. In other words, $Phn = Pn - PO$, the pressure sensor height measurement at time n, Phn, is the difference between the pressure sensor reading at time n, Pn, and the pressure sensor reading at the reference point, PO. The pressure at the reference point says nothing about height above ground at that point. However, one may assume something about the reference point, for example that the reference point is at ground level or at 2 meters above ground level for example. As long as the assumption is valid, e.g. ground is flat, no buildings, the pressure sensor will give an accurate height measurement. In that case, the offset is known by assumption. In other words, the offset is the difference between the measured pressure sensor height and the relative height to the ground, as illustrated in FIG. 2.

FIG. 2 illustrates the aircraft moving in a scene. The air pressure sensor reading here provides the air pressure and gives a calculable height in meters, which is the air pressure reference height. In other words, since there is nothing positioned under the aircraft, height=air pressure sensor reading, and there is no offset. However, as the aircraft changes altitude and moves over the box, the aircraft's relative height above the ground is no longer H=P, but H=P+O. The difference between the reference height, which the aircraft started out at, and the ground is then the offset O. Remember that movement along the Z-axis has positive direction down. Consequently, the offset will change because of sensor drift as well as actual movement of the aircraft as it translates over slopes, stairs, buildings and objects.

According to the present invention, it is better to estimate the air pressure sensor offset instead of the depth because the offset will vary more slowly than the depth. For instance, when changing altitude without moving in any other direction, the depth will change continuously, while the offset will remain the same since the aircraft is horizontally stationary and the scenery underneath does not vary.

It is important to note again that the method of the present innovation would also work with minimal adaptations with any other sort of distancing sensors, however with the adaptations required for that particular sensor.

A Change in Altitude

A change in the aircraft's altitude enables measurement of the following:
1. Absolute scale factor of the camera's 3D translation
2. Depth, i.e. the distance from the camera to each feature
3. Air pressure sensor offset, i.e. difference between the absolute air pressure sensor reading and the ground.

According to the example embodiments here disclosed, the aircraft may perform these measurements whenever there is a change in altitude. To be able to provide a continuous calculation of the depth, one could for example deliberately change the altitude by making the aircraft move up and down in a predefined pattern. For example, in a low amplitude sine/cosine wave or any other pattern relative to the aircraft's Z-axis. A movement according to a predefined pattern would further enable the aircraft to measure frequently and thus improve the accuracy of the estimate by removing measurement noise.

Because of noise in both the air pressure sensor as well as in the calculation of pixel displacement, the scale factor, depth, and offset measurements are all subject to noise. One skilled in the art would however recognize that it is easier to remove noise from a measurement that varies slowly with time. Therefore, whenever possible it is better to use the air pressure sensor offset, than depth measurement as a basis. Further, it is better to use depth than the absolute scale factor derived directly from the difference in air pressure readings.

Absolute Scale Factor

According to the present invention, a unit-less measurement of the translation is present and provided by the autopilot system. By further providing an absolute measurement of the translation in a single direction, for example in Z-direction by the example embodiment here elaborated, one may determine the absolute scale of translation in the other direction as well by simple calculation.

The translation in X- and Y-direction is known relative to translation in Z-direction. That is, $$\left(\frac{[te_x, te_y, te_z]}{te_z}\right) * dA_p(m) = [t_x, t_y, t_z](m)$$

Where estimated translation in X-direction is: $te_x$, $te_y$ is estimated translation in Y-direction, $te_z$ is estimated translation in Z-direction, and $dA_p$ is the difference in air pressure converted to meters.

As mentioned, a normalized unit-less relative movement $[te_x, te_y, te_z]$ is estimated by the aircraft. In a first step, we need to scale the vector function with respect to the Z-value, since this is determined by the change in altitude as explained above. $te_z$ would then become 1, and by multiplying with the Z-movement determined by the difference in air pressure, converted to meters, the determined translation in all three axis is provided.

If a different distance measurement means is utilized that can determine the translation in X or Y direction, one simply needs to divide the equation by the respective $te_x$ or $te_y$ value to scale the equation with respect to that value to provide the result. By this, the aircraft is able to determine the actual translation of the aircraft.

Determining Depth and Air Pressure Offset

Figure 7A:
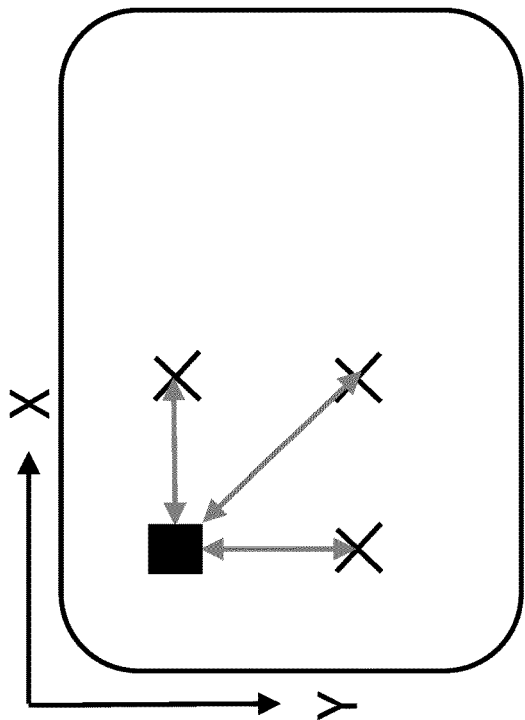
FIG. 7a illustrates an example of an image A, captured with a vertical camera position before an alteration in altitude. Here the distance from one feature to several features are measured.
Figure 7B:
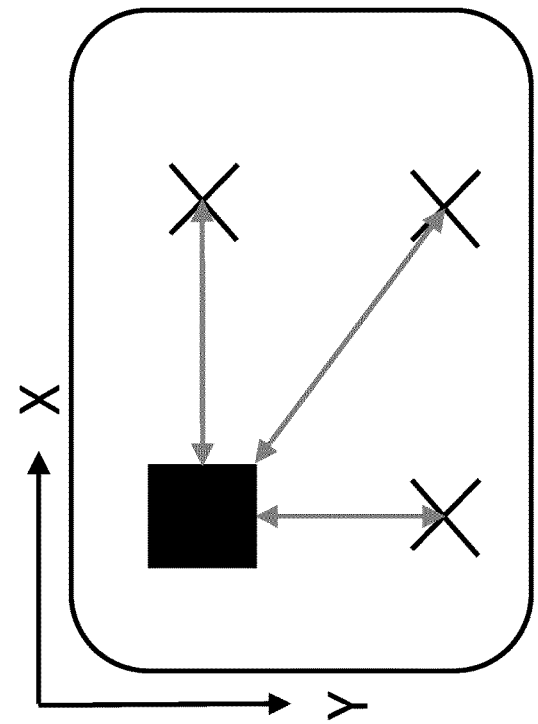
FIG. 7b illustrates an example of an image B, captured with a vertical camera position after an alteration in altitude. The distance from one feature to several features are measured again, and compared to the distance from image A.

With the system according to the example embodiment of the present invention, one may also determine the depth to features in the aircrafts surroundings and the offset. To determine this, one further needs to measure the change in feature location from image A to image B, caused by the change in altitude. One skilled in the art would know that this displacement is measured in pixels, by comparing the pixel location of one identifiable feature in image A to the pixel location of the same identifiable feature in image B, as illustrated in different implementations in FIG. 5-7.

In other words, we have a measurement of the distance, in the aircraft's Z-direction, traveled by the camera from point A to point B and need to measure the apparent distance, dPx, traveled in the images, also in the aircraft's Z-direction.

Figure 3B:
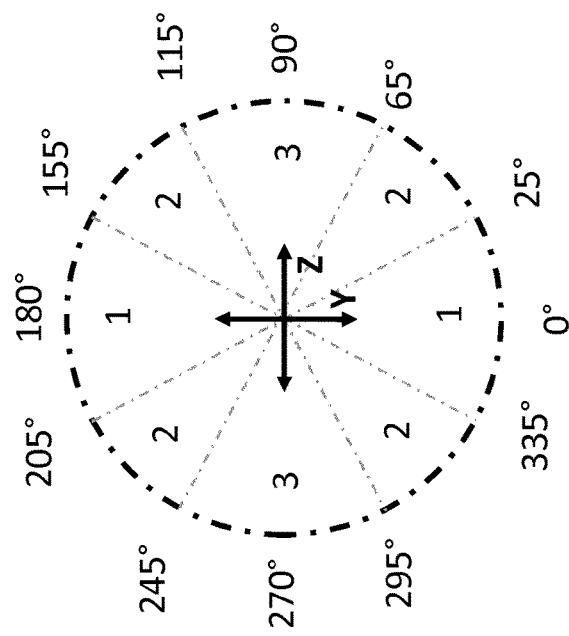
FIG. 3b illustrates the orientation of the camera over 360 degrees and the associated method utilized to calculate the depth at the various points.

According to one example embodiment of the present invention, the method of determining this displacement depends on the angle of the camera relative to the ground. The nature of UAVs implies that they operate at several angles and positions. Electronic and/or mechanical pan and tilt functions have also been implemented to increase the operational capabilities. Thereby a camera may not be oriented in any fixed direction, and one would have to account for all orientations. With reference to FIG. 3b, since one can mirror methods throughout the circle of possible camera orientations. In FIG. 3b, the various sectors are shown and referred to as 1, 2 and 3, that corresponds to a method of calculating the depth, as to be explained. For simplicity, angles are referred to as between 0°-90°, but this could relate to any of the sectors, with reference to FIG. 3b.

Likewise, the nature of rotary winged UAVs implies that they can rotate the heading on a horizontal plane, yaw, and the example embodiment here accounts for all rotational position of the aircraft in that horizontal circle. Consequently, the rotation of the aircraft may have changed slightly from image A to image B, but as long as the same features are visible in the two images, this rotation is handled by the autopilot system.

Figure 4A:
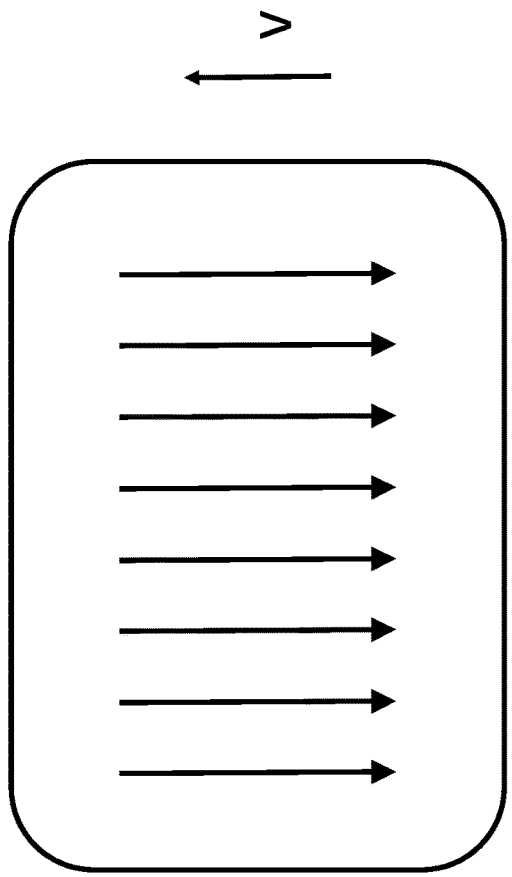
FIG. 4a illustrates the direction of feature movement in a horizontally captured image as the aircraft experiences an increase in altitude.

According to the present example embodiment, the first method measures dPx as a change in the camera's Y-axis, i.e. up/down in the image, with reference to FIGS. 4a, 5a and 5b. According to the example embodiment, this method is utilized if the camera is considered horizontally oriented, and the aircraft translation is vertical. Purely as an example, this may imply a camera orientation of between 60° and 90°, more preferably between 65° and 90°. With a horizontal camera orientation, the features observed in the images from point A and B will appear to move up and down in the image when there is an altitude change from point A to point B, illustrated in FIGS. 5a and 5b.

Measuring the change in the camera's Y-axis is straightforward once the feature has been located in both image A and image B. The formula is given as:

$$dPx = y_B - y_A,$$

where $y_A$ is the feature's y-coordinate in image A and $y_B$ is the feature's y-coordinate in image B, with reference to the axis provided in FIGS. 5a and 5b.

Figure 4B:
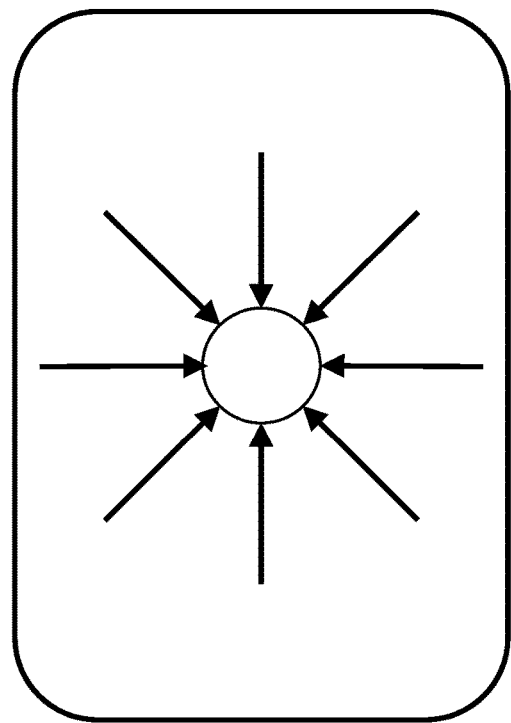
FIG. 4b illustrates the direction of feature movement in a vertically captured image as the aircraft experiences an increase in altitude.

According to the present example embodiment, the second method measures dPx as a change in the camera's Z-axis, i.e. in/out of the image. According to the example embodiment, this method is utilized if the aircraft's movement is parallel to the camera orientation. This may for example be movement in the aircraft's Z-axis, up/down, with the camera in a vertical orientation. Vertical orientation preferably implies a camera orientation of between 0° and 30°, more preferably between 0° and 25°. With a vertical camera orientation, the features observed in the images from point A and B will appear to move in/out of the image when there is an altitude change from point A to point B, as illustrated in FIG. 4b. However, a movement in the aircraft's X or Y-axis with the camera pointing in X or Y direction, and with an approximately horizontal orientation, also causes the images from point A and B to appear to move in/out.

Determining the feature displacement due to change in the camera's Z-axis is not as straightforward as determining the change in the camera's Y-axis. As illustrated in FIGS. 6a and 6b, when the aircraft changes altitude, features will move in or out from one image to the next and collectively appear to expand or contract. However, one may compare the sum of the distances, sdA, from one of the features, say $fA_1$, feature 1 in image A, to all other features in that same image with the sum of the distances from that same feature located in the image captured at point B, $fB_1$, to all other features in image B.

$$sd_A = \sum_{i=2}^{n} \sqrt{(fA_i(1) - fA_1(1))^2 + (fA_i(2) - fA_1(2))^2}$$

Likewise:

$$sd_B = \sum_{i=2}^{n} \sqrt{(fB_i(1) - fB_1(1))^2 + (fB_i(2) - fB_1(2))^2}$$

The value $sd_A$ will be less than $sd_B$ when moving in and greater than $sd_B$ when moving out. When measuring feature displacement in this way, the following relationship holds:

$$depthA * sd_A = depthB * sd_B$$

These equations for the first and second method provide the basis for future calculations in a practical implementation, resulting in a measurement of depth or pressure sensor offset, both from the example embodiment of the present invention described herein.

Alternatively, an aircraft could have several cameras oriented in different directions, and each direction would then be associated to one of the three methods to be described.

Practical Implementation: Offset Calculation, Vertical Camera Orientation

According to one example, it is necessary to observe the ground with the camera in order to estimate the pressure sensor offset, which then may be used to calculate the height above ground at the current aircraft location. For practical purposes, one may also consider the height as vertical depth.

As an example, vertically orientated may preferably imply a camera orientation of between 0° and 30°, more preferably between 0° and 25°. This corresponds to sector 1 in FIG. 3b. This further entails that one may utilize the depth relationship depthA*$sd_A$=depthB*$sd_B$. From this relationship, we have that;

$$depthB = \frac{depthA * sdA}{sdB}$$

In this practical implementation, we are determining the offset, so let:

$$sd = \frac{sdA}{sdB}$$

and from the equation: H=P+O one gets that:

depth$A$=$P_A$+O, and: depth$B$=$P_B$+O

Further, by combining these two equations one is provided with:

$$P_B + O = P_A * sd + O * sd$$
$$O(sd - 1) = P_B - (P_A * sd)$$
$$O = \frac{(P_B - P_A * sd)}{sd - 1}$$

By determining the air pressure height in A, B, and the change in the feature position sdA and sdB one gets the offset, which may be used to determine vertical depth as.

depth$B$=$P_B$+O

Practical Implementation: Depth Calculation, Camera Orientation Between 25° and 65°

Purely as an example, the camera is considered to be orientated between a vertical and horizontal position if it is positioned at an angle between 30° and 60°, more preferably between 25° and 65°. This corresponds to sector 2 in FIG. 3b. Further, when the camera is angled downwards by an angle of between 25° and 65°, a change in altitude will result in a translation in both the camera's Y- and Z-direction and neither of the methods for calculating these two instances may be used as a basis for depth calculation.

However, by utilizing the same measure of pixel change as when the camera is perpendicular, one gets:

depth$A$*$sd_A$=depth$B$*$sd_B$

Rewriting above as:

$$depthB = \frac{depthA * sd_A}{sd_B}$$

and for simplicity, remember that:

$$sd = \frac{sd_A}{sd_B}.$$

We then have that:

depth$B$=depth$A$*$sd$

This is an equation with two unknown. One may, however, assume the change in altitude, dAp to be so small compared to the relative depth to a feature, that one can simplify the expression by substituting depthA+$dA_p$ for depthB. Thus we are provided with a single unknown:

depth$A$+$dAp$=depth$A$*$sd$

Rearranging:

$dAp$=depth$A$*$sd$−depth$A$ and simplifying we get:

$dAp$=depth$A$($sd$−1)

and then:

$$depthA = \frac{dAp}{(sd - 1)}$$

but since depthB is the depth in question, we substitute for depthA as follows depth$A$=depth$B$−$dAp$ to get:

$$depthB - dAp = \frac{dAp}{(sd - 1)}$$

and rearranging:

$$depthB = \frac{dAp}{(sd - 1)} + dAp$$

Thereby we have a method of calculating the depth B, when the camera is oriented between a horizontal and vertical position.

Practical Implementation: Depth Estimation, Horizontal Camera Orientation

According to the example embodiment of the present invention, it is also necessary to be able to calculate the depth when the camera is approximately parallel with a horizontal plane. Purely as an example, the camera is considered to be horizontally orientated if it is positioned at an angle between 60° and 90°, more preferably between 65° and 60°. This corresponds to sector 3 in FIG. 3b. When the camera is oriented parallel with the ground, the features used in the calculation are typically points on objects that are facing the camera and not points on the horizontal plane. A change in altitude in this case corresponds to a change in the camera's Y-axis as shown in FIGS. 5a and 5b.

According to prior art, so called stereo vision, utilize two cameras mounted in line to capture two images. The images are compared, and from them the depth computed. According to the example embodiment here described, two pictures is taken at separate altitudes, and by utilizing the same principles as in stereo vision, one may calculate the depth with a horizontal camera orientation.

From stereo vision, one has that:

$$\text{Depth} = \frac{f * b}{d}.$$

Where f is focal length of the camera, b is the physical distance from camera position A to B in a single dimension measured in meters, and d is the distance in pixels that the feature has moved from image A to image B. That is, the difference in feature location from image A and image B in the relative direction. In an application with a stereo vision system, b is a fixed measurement, and determined by a calibration procedure.

The same equation may be applied in the example embodiment described herein. However, in this case b is not fixed, but provided by the air pressure sensor, as the determined alteration in altitude.

In other words, b=dAp, while d=dPx as described previously. Remembering that depthA=depthB in this case, the equation then becomes:

$$\text{depth} = \frac{f * dAp}{dPx}$$

The invention claimed is:

1. A method for determining a distance from an aerial vehicle to a target feature using an image sensor and an aviation altitude sensor each coupled to the aerial vehicle, the method comprising:
    capturing, at a first position of the aerial vehicle, a first image including the target feature and a number of adjacent features;
    receiving a first aviation altitude corresponding to the first position of the aerial vehicle;
    altering a vertical position of the aerial vehicle from the first position to a second position of the aerial vehicle;
    capturing, at the second position of the aerial vehicle, a second image including the target feature and the number of adjacent features;
    receiving a second aviation altitude corresponding to the second position of the aerial vehicle; and
    determining a target distance from the second position of the aerial vehicle to the target feature, wherein the target distance is based at least in part on the first aviation altitude, the second aviation altitude, a first pixel position of the target feature in the first image, and a second pixel position of the target feature in the second image.

2. The method of claim 1, wherein:
    the image sensor is oriented substantially vertically; and
    the target distance is related to the first aviation altitude, the second aviation altitude, a first pixel position of the target feature in the first image, and a second pixel position of the target feature in the second image by at least the following equation:

$$P_B + \frac{\left(P_B - P_A * \frac{sdA}{sdB}\right)}{\frac{sdA}{sdB} - 1},$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

3. The method of claim 2, wherein:
    the image sensor is oriented substantially vertically in the interval [335°, 25°] or [155°, 205°]; and
    the image sensor is able to be oriented within a vertical plane such that 0° is defined as the vertical downwards direction.

4. The method of claim 1, wherein:
    the image sensor is oriented substantially between vertically and horizontally; and
    the target distance is related to the first aviation altitude, the second aviation altitude, a first pixel position of the target feature in the first image, and a second pixel position of the target feature in the second image by at least the following equation:

$$\frac{|P_B - P_A|}{\left(\frac{sdA}{sdB} - 1\right)} + |P_B - P_A|,$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

5. The method of claim 4, wherein:
    the image sensor is oriented substantially between vertically and horizontally in the interval [25°, 65°] or [115°, 155°] or [205°, 245°] or [295°, 335°]; and
    0° is defined as the vertical downwards direction.

6. The method of claim 1, wherein:
    the image sensor is oriented substantially horizontally; and
    the target distance is related to the first aviation altitude, the second aviation altitude, a first pixel position of the target feature in the first image, and a second pixel position of the target feature in the second image by at least the following equation:

$$\frac{f * |P_B - P_A|}{|y_B - y_A|},$$

where f is a focal length associated with the image sensor, $y_A$ is a vertical pixel position of the target feature corresponding to the first pixel position of the target feature, $y_B$ is a vertical pixel position of the target feature corresponding to the second pixel position of the target feature, $P_A$ is the first aviation altitude, and $P_B$ is the second aviation altitude.

7. The method of claim 6, wherein:
the image sensor is oriented substantially horizontally in the interval [65°, 115°] or [245°, 295°]; and
0° is defined as the vertical downwards direction.

8. The method of claim 1, wherein:
the aviation altitude sensor comprises an air pressure sensor, an ultrasound sensor, a laser sensor, and/or a radar sensor configured to measure and provide aviation altitudes.

9. The method of claim 1, wherein the aviation altitude sensor comprises an air pressure sensor, the method further comprising:
determining an air pressure sensor offset corresponding to the air pressure sensor, wherein the air pressure sensor offset is related to the first aviation altitude, the second aviation altitude, a first pixel position of the target feature in the first image, and a second pixel position of the target feature in the second image by at least the following equation:

$$\frac{\left(P_B - P_A * \frac{sdA}{sdB}\right)}{\frac{sdA}{sdB} - 1},$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

10. The method of claim 1, further comprising:
altering the vertical position of the aerial vehicle from the second position to the first position of the aerial vehicle;
capturing, at the first position of the aerial vehicle, a third image including at least the target feature;
receiving a third aviation altitude corresponding to the first position of the aerial vehicle; and
determining a second target distance from the first position of the aerial vehicle to the target feature, wherein the second target distance is based, at least in part, on the second aviation altitude, the third aviation altitude, the second pixel position of the target feature in the second image, and a third pixel position of the target feature in the third image.

11. A system comprising:
an autopilot for an aerial vehicle
an orientable image sensor configured to be coupled to the aerial vehicle; and
an aviation altitude sensor coupled to the aerial vehicle, wherein the autopilot is configured to:
capture, at a first position of the aerial vehicle, a first image including a target feature and a number of adjacent features;
receive a first aviation altitude corresponding to the first position of the aerial vehicle;
alter a vertical position of the aerial vehicle from the first position to a second position;
capture, at the second position of the aerial vehicle, a second image including the target feature and the number of adjacent features;
receive a second aviation altitude corresponding to the second position of the aerial vehicle; and
determine a target distance from the second position of the aerial vehicle to the target feature, wherein the target distance is based at least in part on the first aviation altitude, the second aviation altitude, a first pixel position of the target feature in the first image, and a second pixel position of the target feature in the second image.

12. The system of claim 11, wherein:
the image sensor is oriented substantially vertically; and
the target distance is related to the first aviation altitude, the second aviation altitude, a first pixel position of the target feature in the first image, and a second pixel position of the target feature in the second image by at least the following equation:

$$P_B + \frac{\left(P_B - P_A * \frac{sdA}{sdB}\right)}{\frac{sdA}{sdB} - 1},$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

13. The system of claim 12, wherein:
the image sensor is oriented substantially vertically in the interval [335°, 25°] or [155°, 205°]; and
0° is defined as the vertical downwards direction.

14. The system of claim 11, wherein:
the image sensor is oriented substantially between vertically and horizontally; and
the target distance is related to the first aviation altitude, the second aviation altitude, a first pixel position of the target feature in the first image, and a second pixel position of the target feature in the second image by at least the following equation:

$$\frac{|P_B - P_A|}{\left(\frac{sdA}{sdB} - 1\right)} + |P_B - P_A|,$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

15. The system of claim 14, wherein:
the image sensor is oriented substantially between vertically and horizontally in the interval [25°, 65°] or [115°, 155°] or [205°, 245°] or [295°, 335°]; and
0° is defined as the vertical downwards direction.

16. The system of claim 11, wherein:
the image sensor is oriented substantially horizontally; and
the target distance is related to the first aviation altitude, the second aviation altitude, a first pixel position of the target feature in the first image, and a second pixel position of the target feature in the second image by at least the following equation:

$$\frac{f * |P_B - P_A|}{|y_B - y_A|},$$

where f is a focal length associated with the image sensor, $y_A$ is a vertical pixel position of the target feature corresponding to the first pixel position of the target feature, $y_B$ is a vertical pixel position of the target feature corresponding to the second pixel position of the target feature, $P_A$ is the first aviation altitude, and $P_B$ is the second aviation altitude.

17. The system of claim 16, wherein:
the image sensor is oriented substantially horizontally in the interval [65°, 115°] or [245°, 295°]; and
0° is defined as the vertical downwards direction.

18. The system of claim 11, wherein:
the aviation altitude sensor comprises an air pressure sensor, an ultrasound sensor, a laser sensor, and/or a radar sensor configured to measure and provide aviation altitudes.

19. The system of claim 11, wherein the aviation altitude sensor comprises an air pressure sensor, and wherein the autopilot is configured to:
determine an air pressure sensor offset corresponding to the air pressure sensor, wherein the air pressure sensor offset is related to the first aviation altitude, the second aviation altitude, a first pixel position of the target feature in the first image, and a second pixel position of the target feature in the second image by at least the following equation:

$$\frac{\left(P_B - P_A * \frac{sdA}{sdB}\right)}{\frac{sdA}{sdB} - 1},$$

where sdA is a sum of respective distances in terms of image pixels within the first image from the first pixel position of the target feature to the number of adjacent features, sdB is a sum of respective distances in terms of image pixels within the second image from the second pixel position of the target feature to the number of adjacent features, $P_A$ is the first aviation altitude, and $P_B$ is the second aviation altitude.

20. The system of claim 11, wherein the autopilot is further configured to:
alter the vertical position of the aerial vehicle from the second position to the first position of the aerial vehicle;
capture, at the first position of the aerial vehicle, a third image including at least the target feature;
receive a third aviation altitude corresponding to the first position of the aerial vehicle; and
determine a second target distance from the first position of the aerial vehicle to the target feature, wherein the second target distance is based, at least in part, on the second aviation altitude, the third aviation altitude, the second pixel position of the target feature in the second image, and a third pixel position of the target feature in the third image.

* * * * *

UNITED STATES PATENT AND TRADEMARK OFFICE
CERTIFICATE OF CORRECTION

PATENT NO. : 10,337,864 B2
APPLICATION NO. : 15/552195
DATED : July 2, 2019
INVENTOR(S) : Jorunn Helene Melby et al.

It is certified that error appears in the above-identified patent and that said Letters Patent is hereby corrected as shown below:

In the Specification

In Column 5, Line 5, after "a camera.", add:
--The camera is further provided with a certain known focal length f, measured in pixels.--

In Column 7, Line 50, delete "since"

In Column 7, Line 52, change "orientations. In FIG. 3b," to --orientations, and--

In Column 7, Line 53, change "and 3, that" to --and 3. This--

In Column 7, Line 60, change "horizontal circle" to --horizontal plane--

In Column 10, Line 51, change "calculating" to --estimating--

Signed and Sealed this
Twenty-first Day of April, 2020

Andrei Iancu
*Director of the United States Patent and Trademark Office*